(12) United States Patent
Chi

(10) Patent No.: US 10,429,083 B2
(45) Date of Patent: Oct. 1, 2019

(54) MULTI-TYPE AIR CONDITIONER SYSTEM

(71) Applicants: Qingdao Hisense Hitachi Air-Conditioning Systems Co., Ltd., Qingdao, Shandong (CN); HISENSE USA CORPORATION, Suwanee, GA (US); Hisense International Co., Ltd., Qingdao, Shandong (CN)

(72) Inventor: Wugong Chi, Shandong (CN)

(73) Assignees: Qingdao Hisense Hitachi Air-Conditioning Systems Co., Ltd., Qingdao, Shandong (CN); Hisense USA Corporation, Suwanee, GA (US); Hisense International Co., Ltd., Qingdao, Shandong (CN)

( * ) Notice: Subject to any disclaimer, the term of this patent is extended or adjusted under 35 U.S.C. 154(b) by 905 days.

(21) Appl. No.: 14/531,044

(22) Filed: Nov. 3, 2014

(65) Prior Publication Data
US 2015/0059392 A1 Mar. 5, 2015

Related U.S. Application Data

(63) Continuation of application No. PCT/CN2013/083131, filed on Sep. 9, 2013.

(30) Foreign Application Priority Data

Aug. 30, 2013 (CN) .......................... 2013 1 0390513

(51) Int. Cl.
*F24D 3/18* (2006.01)
*F25B 13/00* (2006.01)
(Continued)

(52) U.S. Cl.
CPC ............ *F24D 3/18* (2013.01); *F24D 19/1039* (2013.01); *F25B 13/00* (2013.01); *F25B 31/004* (2013.01);
(Continued)

(58) Field of Classification Search
CPC .................. F24D 19/1039; F24D 3/14; F24D 2220/2072; F24D 2220/2081; F24D 3/146;
(Continued)

(56) References Cited

U.S. PATENT DOCUMENTS 3,933,005 A * 1/1976 Beltz .................. B60H 1/00485
417/279
5,022,459 A * 6/1991 Chiles ..................... E01C 11/26
138/125
(Continued)

FOREIGN PATENT DOCUMENTS

CN 1786624 6/2006
CN 101818968 9/2010
(Continued)

OTHER PUBLICATIONS

EP Appln. No, 13882619.3, Extended European Search Report, dated Oct. 5, 2015, 6 pages.
(Continued)

*Primary Examiner* — Frantz F Jules
*Assistant Examiner* — Nelson J Nieves
(74) *Attorney, Agent, or Firm* — Boyle Fredrickson, S.C.

(57) ABSTRACT

The disclosure discloses a multi-type air conditioner system including: an outdoor machine, a refrigerant pipe connected with an output end of the outdoor machine, a manifold connected with an input end of the refrigerant pipe, an indoor machine connected with an output end of the refrigerant pipe, and a controller connected respectively with the outdoor machine and the indoor machine through a shielded signal line, wherein the multi-type air conditioner system may further include: a pipe set including a composite pipe, a third cutoff valve, a third filter, a third electronic expanding valve, a fourth cutoff valve and a pipe control board. With
(Continued)

the disclosure, heating can be provided by precisely controlling indoor temperature and effectively lower power consumption.

15 Claims, 3 Drawing Sheets

(51) Int. Cl.
  *F24D 19/10* (2006.01)
  *F25B 31/00* (2006.01)
  *F25B 41/04* (2006.01)
  *F24D 3/12* (2006.01)
(52) U.S. Cl.
  CPC ............... *F25B 41/04* (2013.01); *F24D 3/12* (2013.01); *F25B 2313/005* (2013.01); *F25B 2313/006* (2013.01); *F25B 2313/0233* (2013.01); *Y02B 30/12* (2013.01); *Y02B 30/24* (2013.01)
(58) Field of Classification Search
  CPC .. F25B 2313/009021; F25B 2313/0213; F25B 2313/0214; F25B 2313/02145; F25B 29/003; F24F 2001/0044
  See application file for complete search history.

(56) References Cited

U.S. PATENT DOCUMENTS

| | | | | |
|---|---|---|---|---|
| 5,088,646 A * | 2/1992 | Yamagishi | ............... | F24D 15/04 237/2 B |
| 5,996,367 A * | 12/1999 | Harnish | ............... | F04B 35/002 417/295 |
| 6,205,803 B1 * | 3/2001 | Scaringe | ............... | F25B 5/02 165/104.33 |
| 7,845,178 B1 * | 12/2010 | Suharno | ............... | F25B 45/00 62/149 |
| 2005/0150243 A1 * | 7/2005 | Matsuoka | ............... | F25B 13/00 62/324.1 |
| 2006/0288724 A1 * | 12/2006 | Ambs | ............... | F25B 13/00 62/260 |
| 2007/0044494 A1 * | 3/2007 | Ally | ............... | C09K 5/063 62/260 |
| 2008/0000240 A1 * | 1/2008 | Bakker | ............... | F25B 45/00 62/77 |
| 2008/0141698 A1 * | 6/2008 | Hanson | ............... | F25B 5/04 62/324.1 |
| 2009/0241577 A1 * | 10/2009 | Fukushima | ............... | F25B 13/00 62/259.1 |
| 2009/0288437 A1 * | 11/2009 | Matsuoka | ............... | F24F 3/06 62/238.6 |
| 2010/0043473 A1 * | 2/2010 | Koh | ............... | F24F 5/0017 62/259.1 |
| 2011/0214437 A1 * | 9/2011 | Jeong | ............... | F25B 13/00 62/79 |
| 2012/0018129 A1 * | 1/2012 | Ushijima | ............... | F24D 3/082 165/104.19 |
| 2012/0204588 A1 * | 8/2012 | Takenaka | ............... | F25B 13/00 62/238.7 |
| 2012/0324923 A1 * | 12/2012 | Kim | ............... | F24D 3/18 62/79 |
| 2013/0269380 A1 * | 10/2013 | Oya | ............... | F25B 41/043 62/190 |
| 2013/0306301 A1 * | 11/2013 | Tamaki | ............... | F25B 13/00 165/287 |
| 2014/0033750 A1 * | 2/2014 | Tanaka | ............... | F25B 13/00 62/151 |
| 2014/0283541 A1 * | 9/2014 | Feng | ............... | F24F 5/0085 62/324.6 |
| 2015/0308700 A1 * | 10/2015 | Kimura | ............... | F24D 11/0214 62/159 |

FOREIGN PATENT DOCUMENTS

| | | |
|---|---|---|
| CN | 102519171 | 10/2013 |
| CN | 203489365 | 3/2014 |
| CN | 102679482 | 9/2014 |
| EP | 0431491 | 6/1991 |
| EP | 1669695 | 6/2006 |
| EP | 2015005 | 1/2009 |
| EP | 2369250 | 9/2011 |
| FR | 2679016 | 12/1997 |
| JP | S5494740 | 7/1979 |
| JP | H03217723 | 9/1991 |
| JP | 2003240381 | 8/2003 |
| WO | 9312390 | 6/1993 |
| WO | 2012172605 | 12/2012 |

OTHER PUBLICATIONS

PCT/CN2013/083131, International Search Report, dated Dec. 5, 2013, 5 pages.

* cited by examiner

MULTI-TYPE AIR CONDITIONER SYSTEM

CROSS-REFERENCE TO RELATED APPLICATIONS

The present application claims priority to and is a continuation of International Patent Application PCT/CN2013/083131, which claims priority to Chinese Patent Application No. 201310390513.3, filed on Aug. 30, 2013 in the People's Republic of China, entitled "UNDERFLOOR-HEATING MULTI-TYPE AIR CONDITIONER SYSTEM".

BACKGROUND

The present disclosure relates to the field of air conditioners and particularly to a multi-type air conditioner system.

A multi-type air conditioner system is generally applicable to clustered buildings and can provide users with comfortable indoor living and working environments despite a hostile outdoor ambient. During operation in a heating mode, the traditional multi-type air conditioner system transmits hot air to the indoor through vents arranged on a ceiling, but the hot air tends to be concentrated proximate to the ceiling so that the indoor temperature drops stepwise from the top down, and the users feel hot at their heads and cold at their feet; and also the multi-type air conditioner system raises the air pressure and the air transmission speed of a fan so that the overall indoor temperature reaches a preset value, and in this meantime the indoor noise will become more apparent, thus degrading the comfortability of the users.

SUMMARY

According to one or more aspects of the disclosure, there is provided a multi-type air conditioner system including: an outdoor machine, a refrigerant pipe connected with an output end of the outdoor machine, a manifold connected with an input end of the refrigerant pipe, an indoor machine connected with an output end of the refrigerant pipe, and a controller connected respectively with the outdoor machine and the indoor machine through a shielded signal line, wherein the multi-type air conditioner system may further include: a pipe set including a composite pipe, a third cutoff valve, a third filter, a third electronic expanding valve, a fourth cutoff valve and a pipe control board; the composite pipe is connected with the outdoor machine through the refrigerant pipe and the manifold; the third cutoff valve, the third filter and the third electronic expanding valve are arranged in sequence in the inflow direction of a refrigerant on the refrigerant pipe connected with a refrigerant inflow end of the composite pipe; the third electronic expanding valve is electrically connected with the pipe control board; and the fourth cutoff valve is arranged on the refrigerant pipe connected with a refrigerant outflow end of the composite pipe.

According to one or more embodiments of the disclosure, the outdoor machine may include an outdoor machine control board unit, a refrigerant flow direction control unit, a refrigerant control unit, a valve control unit, an overpressure protection unit and a filter protection unit, wherein the outdoor machine control board unit is configured to transmit a refrigerant flow direction control signal to the refrigerant flow direction control unit upon reception of a heating or refrigeration operation signal transmitted by the controller and to transmit a refrigerant control signal to the refrigerant control unit according to received indoor temperature and user-preset temperature transmitted by the controller; the refrigerant flow direction control unit is configured to open the refrigerant pipe connected with the pipe set so that the refrigerant flows into the pipe set upon reception of the refrigerant flow direction control signal transmitted by the outdoor machine control board unit or to open the refrigerant pipe connected with the indoor machine so that the refrigerant flows into the indoor machine upon reception of the refrigeration operation signal transmitted by the outdoor machine control board unit; the refrigerant control unit is configured to control the modality of the refrigerant and to control the flow of the refrigerant upon reception of the refrigerant control signal transmitted by the outdoor machine control board; the valve control unit is configured to control the valves in the outdoor machine through the outdoor machine control board unit; the overpressure protection unit is configured to detect the pressure of the refrigerant in the refrigerant pipe and to stop a compressor from operating when the pressure exceeds a threshold; and the filter protection unit is configured to filter out impurities in the refrigerant and to return lubricating oil separated from the refrigerant to the compressor.

According to one or more embodiments of the disclosure, the refrigerant flow direction control unit may include a first electromagnetic valve, a second electromagnetic valve, a third electromagnetic valve and a fourth electromagnetic valve, wherein the first electromagnetic valve is arranged on the refrigerant pipe connected with a refrigerant inflow end of the pipe set to control the refrigerant pipe connected with the refrigerant inflow end of the pipe set to be opened or closed; the second electromagnetic valve is arranged on the refrigerant pipe connected with a refrigerant outflow end of the indoor machine to control the refrigerant pipe connected with the refrigerant outflow end of the indoor machine to be opened or closed; the third electromagnetic valve is arranged on the refrigerant pipe connected with a refrigerant outflow end of the pipe set to control the refrigerant pipe connected with the refrigerant outflow end of the pipe set to be opened or closed; and the fourth electromagnetic valve is arranged on the refrigerant pipe connected with a refrigerant inflow end of the indoor machine to control the refrigerant pipe connected with the refrigerant inflow end of the indoor machine to be opened or closed.

According to one or more embodiments of the disclosure, when the multi-type air conditioner system operates in a refrigeration mode, the controller transmits a refrigeration operation signal to the outdoor machine control board unit through the shielded signal line, so that the outdoor machine control board unit controls the second electromagnetic valve and the fourth electromagnetic valve in the refrigerant flow direction control unit to be opened and the first electromagnetic valve and the third electromagnetic valve to be closed.

According to one or more embodiments of the disclosure, when the multi-type air conditioner system operates in a heating mode, the controller transmits a heating operation signal to the outdoor machine control board unit through the shielded signal line, so that the outdoor machine control board unit controls the second electromagnetic valve and the fourth electromagnetic valve in the refrigerant flow direction control unit to be closed and the first electromagnetic valve and the third electromagnetic valve to be opened.

According to one or more embodiments of the disclosure, the refrigerant control unit may include the compressor, a first heat exchanger, a first cold medium distributor, a first refreezer and an outdoor fan motor, wherein an input end of the compressor is connected with the filter protection unit, and an output end thereof is connected with the overpressure protection unit; an input end of the first heat exchanger is connected with the valve control unit, and an output end thereof is connected with the first cold medium distributor; an output end of the first refreezer is connected with the valve control unit; and the outdoor fan motor is arranged proximate to the second heat exchanger.

According to one or more embodiments of the disclosure, the refrigerant control unit further may include a first electronic expanding valve; and an input end of the first electronic expanding valve is connected with an output end of the first cold medium distributor, and an output end thereof is connected with an input end of the first refreezer, and the first electronic expanding valve is electrically connected with the outdoor machine control board.

According to one or more embodiments of the disclosure, the indoor machine may include a second heat exchanger, a second filter, a second cold medium distributor, a second electronic expanding valve, an indoor fan motor, a first cutoff valve, a second cutoff valve and an indoor machine control board, wherein an input end of the second heat exchanger is connected with an output end of the second cold medium distributor, and an output end thereof is connected with an input end of the first cutoff valve; an input end of the second filter is connected with an output end of the second cutoff valve, and an output end thereof is connected with an input end of the second electronic expanding valve; an input end of the second cold medium distributor is connected with an output end of the second electronic expanding valve, and an output end thereof is connected with the input end of the second heat exchanger; an input end of the second electronic expanding valve is connected with an output end of the second filter, and an output end thereof is connected with the input end of the second cold medium distributor, and the second electronic expanding valve is connected with the indoor machine control board; the indoor fan motor is arranged proximate to the second heat exchanger; the input end of the first cutoff valve is connected with an output end of the second heat exchanger, and the output end thereof is connected with an input end of the manifold; and an input end of the second cutoff valve is connected with an input end of the refrigerant pipe, and the output end thereof is connected with the input end of the manifold.

According to one or more embodiments of the disclosure, the composite pipe is a copper pipe on the surface of which Polyethylene of raised temperature resistance (PE-RT), polyvinylchloride (PVC) or cross-linked polyethylene (PE-X) is coated.

According to one or more embodiments of the disclosure, when the multi-type air conditioner system operates in a heating mode, the controller transmits the indoor temperature and the user-preset temperature data to the pipe set control board through the shielded signal line, and the pipe set control board controls the extent to which the third electronic expanding valve is opened according, to the received signal to thereby adjust heating temperature.

According to one or more embodiments of the disclosure, the pipe set is a set of underfloor-heating pipes.

BRIEF DESCRIPTION OF THE DRAWINGS

In order to describe technical solutions of one or more embodiments of the disclosure or in the prior art more clearly, the drawings to be used in the description of one or more embodiments or the prior art will be introduced below in brief. Apparently the drawings described below are merely some embodiments of the disclosure.

DETAILED DESCRIPTION

In order to make the objects, technical solutions and advantages of the disclosure more apparent, the disclosure will be described below with reference to the drawings and one or more embodiments thereof. However it shall be noted that numerous details listed in the description are merely intended to facilitate thorough understanding by readers of one or more aspects of the disclosure, and these aspects of the disclosure can also be implemented without these details.

Figure 1:
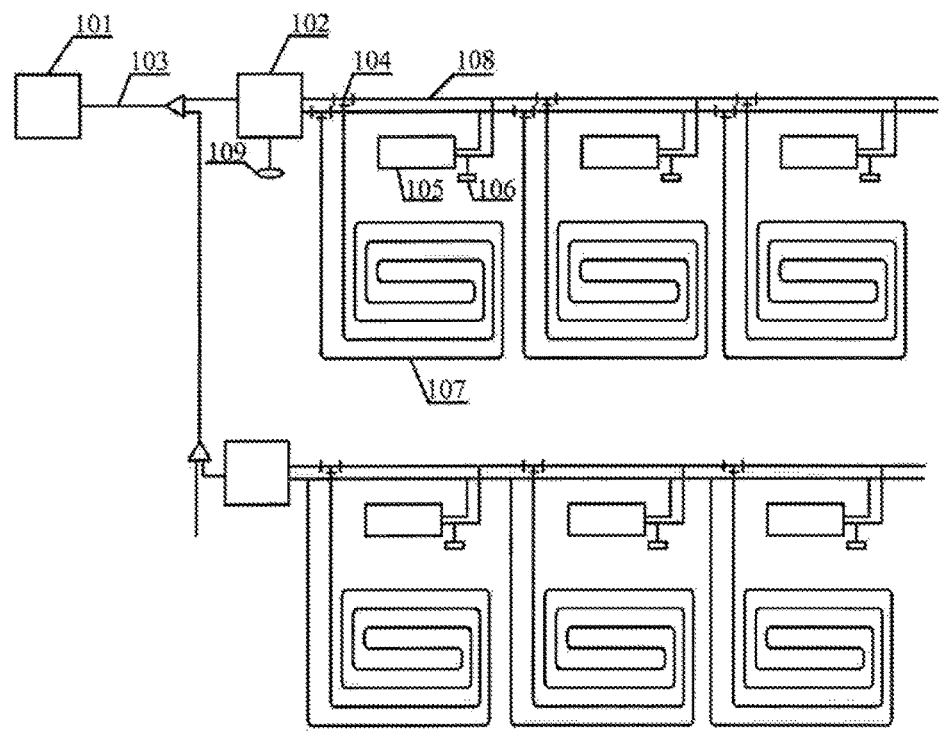
FIG. 1 is a schematic structural diagram of the air-source heat pump air conditioner system in the art.

At present a air-source heat pump air conditioner system radiates heat to the indoor through pipes laid under the ground to thereby improve the problem of non-uniform heating of the traditional multi-type air conditioner, and referring to FIG. 1, the air-source heat pump air conditioner system may include an outdoor machine 101, an indoor machine 102, a refrigerant pipe 103, an electric three-way value 104, a fan coil 105, a three-position switch 106, a pipe 107, a water pipe 108 and a controller 109. The outdoor machine 101 is connected with the indoor machine 102 through the refrigerant pipe 103; the fan coil 105 is connected in parallel with the pipe 107 and connected with the indoor machine 102 through the water pipe 108; the three-position switch 106 is connected with the fan coil 105; the controller 109 is connected with the indoor machine 102; and the electric three-way value 104 is arranged among the indoor machine 102, the fan coil 105 and the pipe 107, For refrigeration in summer, the outdoor machine 101 and the indoor machine 102 produce 7° C. cold water, and the electric three-way value 104 controls the water pipe 108 directed to the pipe 107 to be closed and the water pipe 108 directed to the fan coil 105 to be opened so that the cold water flows into the fan coil 105 through the water pipe 108 and is circled in the fan coil 105 through the water pump, and the three-position switch 106 controls the air speed of the fan coil 105, and cold air is transmitted to the indoor through the fan coil; and for heating in winter, the outdoor machine 101 and the indoor machine 102 produce 50° C. hot water, and the electric three-way value 104 controls the water pipe 108 directed to the pipe 107 to he opened and the water pipe 108 directed to the fan coil 105 to be closed so that the hot water flows into the pipe 107 through the water pipe 108 and is circled in the pipe 107 through the water pump, and then heat is radiated by the pipe to the indoor.

As can be apparent from the technical solution above, with the existing air-source heat pump air conditioner system, during operation in the heating mode, the indoor and outdoor machines produce the hot water at the fixed temperate 50° C. for heating, and the hot water for heating is converted into water at 40° C. after heat exchanging with indoor air in the pipe and flows back into the indoor machine through the water pipe, and throughout the heating process, the indoor ambient temperature can only be adjusted roughly by the controller turning on and off the water pump but can not be controlled precisely in response to a demand of the users; and furthermore when there is a demand for heating in the building for a while, there is heating water in the pipe, so it is necessary to prevent the pipe from being frozen and broken at low temperature by powering the idle air-source heat pump air conditioner system for normal operation of the indoor machine, this resulting in a significant waste of power consumption.

One or more embodiments of the disclosure provides a multi-type air conditioner system including four components which are an outdoor machine, an indoor machine, a pipe set and a controller, where an electromagnetic valve in a refrigerant pipe directed to the pipe set in is closed, and an electromagnetic valve in a refrigerant pipe directed to the indoor machine in is opened so that a refrigerant is cycled only between the outdoor and indoor machines to perform a refrigeration function; whereas the electromagnetic valve in the refrigerant pipe directed to the pipe set in is opened, and the electromagnetic valve in the refrigerant pipe of the indoor machine in is closed so that the refrigerant is cycled only between the outdoor machine and the pipe set to perform a heating function; and electronic expanding valves are arranged respectively in the outdoor machine, the indoor machine and the pipe set, and during operation in a heating mode, a pipe set control board of the pipe set controls the extent to which the electronic expanding valve in the pipe set is opened so as to adjust the flow of the refrigerant so that indoor temperature in the heating mode can be controlled precisely. Since there is no hot water for heating in the pipe set, the air conditioner system can be idle without any operation for preventing the pipe set from being frozen and broken at low temperature, thus improving the reliability while saving power consumption.

Figure 2:
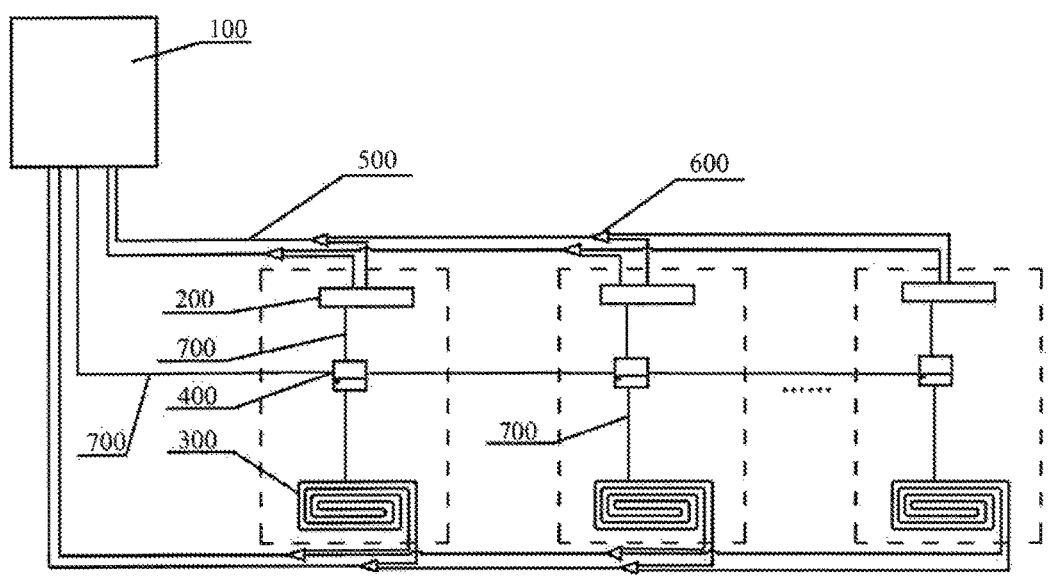
FIG. 2 is a schematic structural diagram of a multi-type air conditioner system according to one or more embodiments of the disclosure.

FIG. 2 is a schematic structural diagram of a multi-type air conditioner system according to one or more embodiments of the disclosure. Referring to FIG. 2, the system may FIG. 2 is a schematic structural diagram of a multi-type air conditioner system according to one or more embodiments of the disclosure. Referring to FIG. 2, the system may include an outdoor machine 100, an indoor machine 200, a pipe set 300, a controller 400, a refrigerant pipe 500, a manifold 600 and a shielded signal line 700.

Where an output end of the outdoor machine 100 is connected with the refrigerant pipe 500.

The outdoor machine 200 is connected with an input end of the refrigerant pipe 500.

The pipe set 300 is connected with the input end of the refrigerant pipe 500.

The controller 400 is connected respectively with an outdoor machine control board of the outdoor machine 100, an indoor machine control board of the indoor machine 200 and a pipe set control board of the pipe set 300 through the shielded signal line 700.

The manifold 600 is connected with the output end of the refrigerant pipe 500.

A second electromagnetic valve and a fourth electromagnetic valve are arranged on the refrigerant pipe 500 connected with the output end of the outdoor machine 100 and an input end of the indoor machine 200; and a first electromagnetic valve and a third electromagnetic valve are arranged on the refrigerant pipe 500 connected with the output end of the outdoor machine 100 and the pipe set.

The outdoor machine 100, the indoor machine 200 and the pipe set 300 are arranged respectively with electronic expanding valves.

In one or more embodiments of the disclosure, the pipe set 300 is a set of underfloor-heating pipes.

In one or more embodiments of the disclosure, when the multi-type air conditioner system operates in a refrigeration mode, the controller 400 transmits a refrigeration operation signal to the control board of the outdoor machine 100 through the shielded signal line 700, and the outdoor machine control board of the outdoor machine 100 controls the second electromagnetic valve and the fourth electromagnetic valve in the outdoor machine 100 to be opened and the first electromagnetic valve and the third electromagnetic valve to be closed. In the meantime, the controller 400 furthers transmits acquired indoor temperature and received user-preset temperature data to the outdoor machine control board through the shielded signal line 700, so that the outdoor machine control board adjusts the operating frequency of a compressor and the rotation speed of an outdoor fan motor of the outdoor machine 100 according to the received data, and a refrigerant discharged by the outdoor machine 100 enters the indoor machine 200 through the refrigerant pipe 500 and the manifold 600, and cold air is transmitted by the indoor machine 200 to rooms; and the controller 400 transmits the acquired indoor temperature and the received user-preset temperature data to the indoor machine control board of the indoor machine 200 through the shielded signal line 700, so that the indoor machine control hoard controls the extent to which the electronic expanding valve of the indoor machine 200 is opened according to the received data so as to adjust the flow of the refrigerant to thereby precisely control the temperature inside the rooms.

When the multi-type air conditioner system operates in a heating mode, the controller 400 transmits a heating operation signal to the outdoor machine control board of the outdoor machine 100 through the shielded signal line 700, and the outdoor machine control board controls the second electromagnetic valve and the fourth electromagnetic valve to be closed and the first electromagnetic valve and the third electromagnetic valve to be opened. In the meantime, the controller 400 furthers transmits acquired indoor temperature and received user-preset temperature data to the outdoor machine control board through the shielded signal line 700, so that the outdoor machine control board adjusts the operating frequency of the compressor and the rotation speed of the outdoor fan motor of the outdoor machine 100 according to the received data, and the refrigerant discharged by the outdoor machine 100 enters the pipe set 300 through the refrigerant pipe 500 and the manifold 600, and heat is transmitted by the pipe set 300 to the rooms for heating; and the controller 400 transmits the acquired indoor temperature and the received user-preset temperature data to the pipe set control board of the pipe set 300 through the shielded signal line 700, so that the pipe set control board controls the extent to which the electronic expanding valve of the pipe set 300 is opened according to the received data so as to adjust the flow of the refrigerant to thereby precisely control the temperature inside the rooms.

Figure 3:
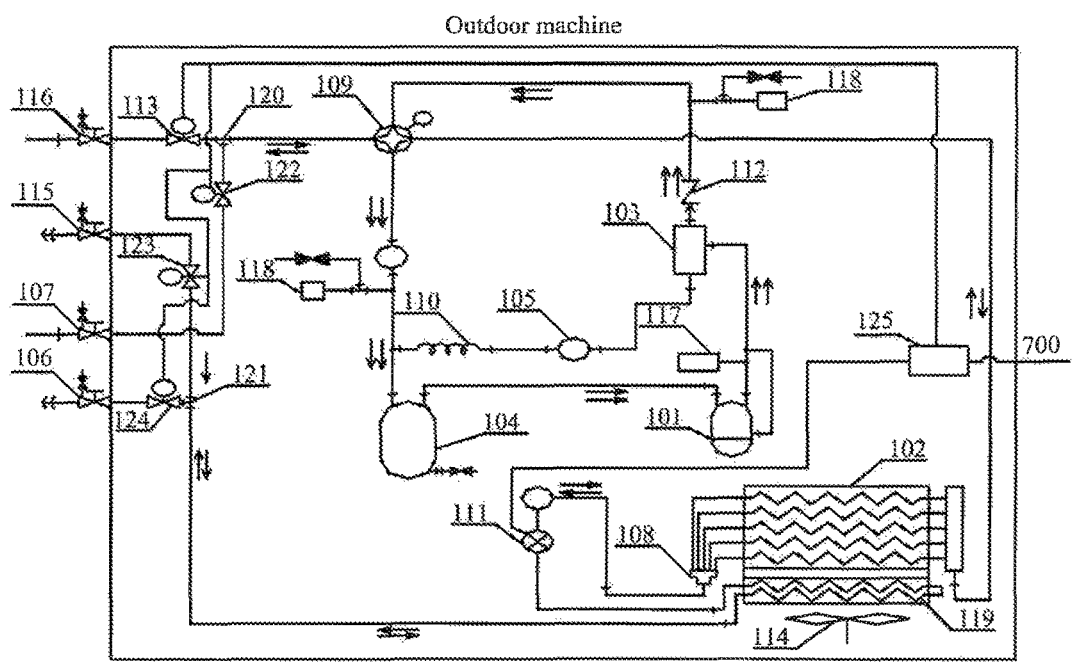
FIG. 3 is a schematic structural diagram of an outdoor machine in the multi-type air conditioner system according to one or more embodiments of the disclosure.

FIG. 3 is a schematic structural diagram of the outdoor machine in the multi-type air conditioner system according to one or more embodiments of the disclosure. Referring to FIG. 3, the outdoor machine may include an outdoor machine control board unit, a refrigerant flow direction control unit, a refrigerant control unit, a valve control unit, an over-pressure protection unit and a filter protection unit.

Where the outdoor machine control board unit is configured to transmit a refrigerant flow direction control signal to the refrigerant flow direction control unit upon reception of the heating or refrigeration operation signal transmitted by the controller 400 and to transmit a refrigerant control signal to the refrigerant control unit according to the received indoor temperature and user-preset temperature transmitted by the controller 400.

The outdoor machine control board unit may include the outdoor machine control board 125.

The refrigerant flow direction control unit is configured to open the refrigerant pipe 500 connected with the pipe set 300 so that the refrigerant flows into the pipe set 300 or to open the refrigerant pipe 500 connected with the indoor machine 200 so that the refrigerant flows into the indoor machine 200 upon reception of the refrigerant flow direction control signal transmitted by the outdoor machine control board 125.

The refrigerant flow direction control unit may include the first electromagnetic valve 113, the second electromagnetic valve 122, the third electromagnetic valve 123 and the fourth electromagnetic valve 124.

The first electromagnetic valve 113 is arranged on the refrigerant pipe 500 connected with the refrigerant inflow end of the pipe set 300 to control the refrigerant pipe 500 connected with the refrigerant inflow end of the pipe set 300 to be opened or closed.

The second electromagnetic valve 122 is arranged on the refrigerant pipe 500 connected with the refrigerant outflow end of the indoor machine 200 to control the refrigerant pipe 500 connected with the refrigerant outflow end of the indoor machine 200 to be opened or closed.

The third electromagnetic valve 123 is arranged on the refrigerant pipe 500 connected with the refrigerant outflow end of the pipe set 300 to control the refrigerant pipe 500 connected with the refrigerant outflow end of the pipe set 300 to be opened or closed.

The fourth electromagnetic valve 124 is arranged on the refrigerant pipe 500 connected with the refrigerant inflow end of the indoor machine 200 to control the refrigerant pipe 500 connected with the refrigerant inflow end of the indoor machine 200 to be opened or closed.

The refrigerant control unit is configured to control the modality of the refrigerant and to control the flow of the refrigerant upon reception of the refrigerant control signal transmitted by the outdoor machine control board 125.

The refrigerant control unit may include the compressor 101, a first heat exchanger 102, a first cold medium distributor 108, a first electronic expanding valve 111, a first refreezer 119 and the outdoor fan motor 114.

An input end of the compressor 101 is connected with an output end of a gas and liquid separator 104, and an output end thereof is connected with a high pressure protection switch 117.

An input end of the first heat exchanger 102 is connected with a second end 109B of a four-way switching valve 109, and an output end thereof is connected with the first cold medium distributor 108.

An input end of the first cold medium distributor 108 is connected with the output end of the first heat exchanger 102, and an output end thereof is connected with an input end of the first electronic expanding valve 111.

The input end of the first electronic expanding valve 111 is connected with the output end of the first cold medium distributor 10, and an output end thereof is connected with an input end of the first refreezer 119, and the first electronic expanding valve 111 is electrically connected with the outdoor machine control board 125.

An output end of the first refreezer 119 is connected with a second end 121B of a second three-way valve 121, and the input end thereof is connected with the first electronic expanding valve 111.

A first end 121A of the second three-way valve 121 is connected with an output end of the third electromagnetic valve 123, the second end 121B of the second three-way valve 121 is connected with the output end of the first refreezer 119, and a third end 121C of the second three-way valve 121 is connected with an output end of an indoor machine liquid pipe cutoff valve 106.

An input end of the third electromagnetic valve 123 is connected with a pipe set liquid pipe cutoff valve 115, and the output end of the third electromagnetic valve 123 is connected with the first end 121A of the second three-way valve 121.

The outdoor fan motor 114 is arranged proximate to the first heat exchanger 102.

The valve control unit is configured to control the valves in the outdoor machine through the outdoor machine control board 125, particularly the indoor machine liquid pipe cutoff valve 106, an indoor machine gas pipe cutoff valve 107, a four-way switching valve 109, a uni-way valve 112, the pipe set liquid pipe cutoff valve 115, a pipe set gas pipe cutoff valve 116, a first three-way valve 120 and a second three-way valve 121.

The over-pressure protection unit is configured to detect the pressure of the refrigerant in the refrigerant pipe and to stop the compressor 101 from operating when the pressure exceeds a threshold, and may include a high-pressure protection switch 117 and a cold medium pressure sensor 118.

The filter protection unit is configured to filter out impurities in the refrigerant and to return lubricating oil separated from the refrigerant to the compressor, and may include an oil separator 103, a gas and liquid separator 104, a first filter 105 and a capillary 110.

An gas inlet of the compressor 101 is connected with a gas discharge pipe of the gas and liquid separator 104, a gas outlet of the compressor 101 is connected with a gas inflow pipe of the oil separator 103, and the high-pressure protection switch 117 is arranged on a pipe connecting the compressor 101 with the oil separator 103; a gas discharge pipe of the oil separator 103 is connected with the uni-way valve 112, an oil return pipe of the oil separator 103 is connected with an input end of the first filter 105, an output end of the first filter 105 is connected with an input end of the capillary 110, and an output end of the capillary 110 is connected with a gas inflow pipe of the gas and liquid separator 104; the other end of the uni-way valve 112 is connected with a first end 109A of the four-way switching valve 109, and the first cold medium pressure sensor 118 is arranged on a pipe connecting the uni-way valve 112 with the first end of the four-way switching valve 109; the second end 109B of the four-way switching valve 109 is connected with the first heat exchanger 102, a third end 109C of the four-way switching valve 109 is connected with the gas and liquid separator 104, and a fourth end 109D of the four-way switching valve 109 is connected with a first end 120A of the first three-way valve 120; a second end 120B of the first three-way valve 120 is connected with the second electromagnetic valve 122, and a third end 120C of the first three-way valve 120 is connected with the first electromagnetic valve 113; the other end of the electromagnetic valve 113 is connected with the pipe set gas pipe cutoff valve 116; the other end of the second electromagnetic valve 122 is connected with the indoor machine gas pipe cutoff valve 107; an output end of the heat exchanger 102 is connected with the input end of the first cold medium distributor 108, the output end of the first cold medium distributor 108 is connected with the first electronic expanding valve 111, the other end of the first electronic expanding valve 111 is connected with the input end of the first refreezer 119, and the output end of the first refreezer 119 is connected with the second end 121B of the second three-way valve 121; the first end 121 A of the second three-way valve 121 is connected with the third electromagnetic valve 123, and the third end 121C of the second three-way valve 121 is connected with the fourth electromagnetic valve 124; the other end of the third electromagnetic valve 123 is connected with the pipe set liquid pipe cutoff valve 115; and the other end of the fourth electromagnetic valve 124 is connected with the indoor machine liquid pipe cutoff valve 106, the outdoor fan motor 114 is arranged proximate to the first heat exchanger 102 and composed of a direct-current motor or an alternating-current motor and an axis-current fan to draw outdoor air into the first heat exchanger 102.

In one or more embodiments of the disclosure, the compressor 101 can be a general compressor, a fixed-frequency gas-supplementing enthalpy-gain compressor, a variable-frequency gas-supplementing enthalpy-gain compressor, a general variable-frequency compressor or a combination of a plurality of compressors.

In a practical application, when the high pressure protection switch 117 detects that the pressure of the refrigerant in the refrigerant pipe exceeds the threshold, the high pressure protection switch 117 is opened, and the compressor 101 is stopped from operating so that the refrigerant pipe can be prevented from being jammed and elements of the compressor 101 can be prevented from being wearing.

Figure 4:
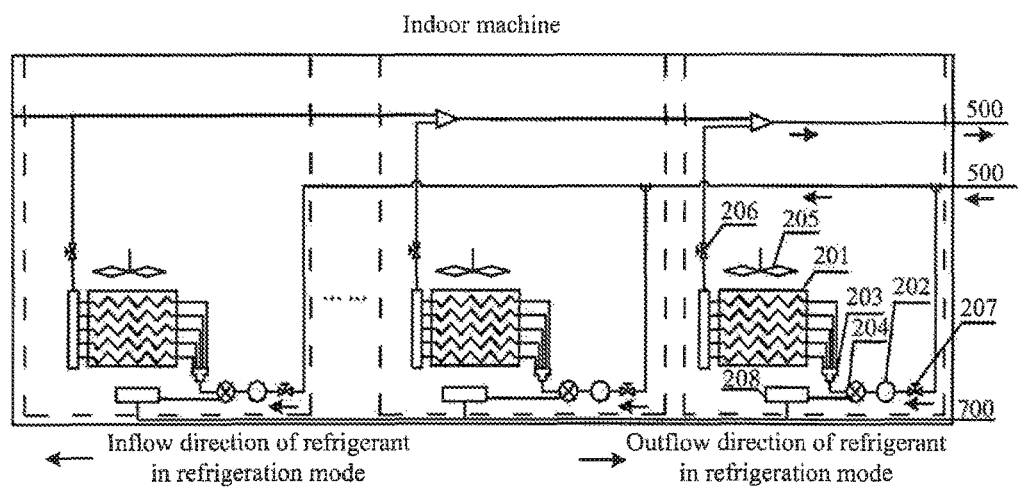
FIG. 4 is a schematic structural diagram of an indoor machine in the multi-type air conditioner system according to one or more embodiments of the disclosure.

FIG. 4 is a schematic structural diagram of the indoor machine in the multi-type air conditioner system according to one or more embodiments of the disclosure. Referring to FIG. 4, the indoor machine may include a second heat exchanger 201, a second filter 202, a second cold medium distributor 203, a second electronic expanding valve 204, an indoor fan motor 205, a first cutoff valve 206, a second cutoff valve 207 and an indoor machine control board 208.

Where an input end of the second heat exchanger 201 is connected with an output end of the second cold medium distributor 203, and an output end thereof is connected with an input end of the first cutoff valve 206; an input end of the second filter 202 is connected with an output end of the second cutoff valve 207, and an output end thereof is connected with an input end of the second electronic expanding valve 204; an input end of the second cold medium distributor 203 is connected with an output end of the second electronic expanding valve 204, and an output end thereof is connected with the input end of the second heat exchanger 201; an input end of the second electronic expanding valve 204 is connected with an output end of the second filter 202, and an output end thereof is connected with the input end of the second cold medium distributor 203, and the second electronic expanding valve 204 is connected with the indoor machine control board 208 through the shielded signal line 700; the indoor fan motor 205 is arranged proximate to the second heat exchanger 201 and composed of a direct-current motor or an alternating-current motor and a centrifugal fan or a cross-flow fan to draw indoor air into the second heat exchanger 201; the input end of the first cutoff valve 206 is connected with the output end of the second heat exchanger 201, and the output end thereof is connected with an input end of the manifold 600; and an input end of the second cutoff valve 207 is connected with the input end of the refrigerant pipe 500, and the output end thereof is connected with the input end of the manifold 600.

Figure 5:
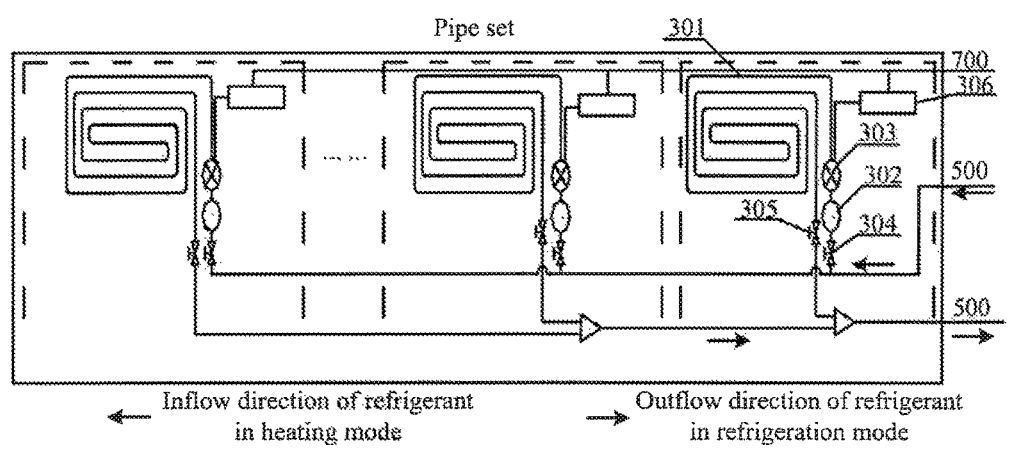
FIG. 5 is a schematic structural diagram of a pipe set in the multi-type air conditioner system according to one or more embodiments of the disclosure.

FIG. 5 is a schematic structural diagram of the pipe set in the multi-type air conditioner system according to one or more embodiments of the disclosure. Referring to FIG. 5.

The pipe set may include: a composite pipe 301, a third filter 302, a third electronic expanding valve 303, a third cutoff valve 304, a fourth cutoff valve 305 and a pipe control board 306.

Where the composite pipe 301 is connected with the outdoor machine 100 through the refrigerant pipe 500 and the manifold 600.

The third cutoff valve 304, the third filter 302 and the third electronic expanding valve 303 are arranged in sequence in the inflow direction of the refrigerant on the refrigerant pipe 500 connected with a refrigerant inflow end of the composite pipe 301.

The third electronic expanding valve 303 is electrically connected with the pipe control board 306.

The fourth cutoff valve 305 is arranged on the refrigerant pipe 500 connected with a refrigerant outflow end of the composite pipe 301.

In one or more embodiments of the disclosure, the composite pipe 301 is a copper pipe on the surface of which the material of Polyethylene of raised temperature resistance (PE-RT) with superior flexibility, high thermal conductivity, high-temperature resistance and pressure resistance is coated or polyvinylchloride (PVC), cross-linked polyethylene (PE-X) or other materials applicable to a pipe can be coated.

An operating principle of the multi-type air conditioner system according to one or more embodiments of the disclosure operating in the refrigeration mode is as follows: the controller 400 transmits the refrigeration operation signal to the outdoor machine control board 125 through the shielded signal line 700, so that the outdoor machine control board 125 controls the second electromagnetic valve 122 and the fourth electromagnetic valve 124 in the outdoor machine 100 to be opened and the first electromagnetic valve 113 and the third electromagnetic valve 123 of the outdoor machine to be closed; and in the meantime, the controller 400 further transmits the acquired indoor temperature and the received user-preset temperature data to the outdoor machine control board 125 and the pipe control board 306 through the shielded signal line 700, so that the outdoor machine control board 125 adjusts the operating frequency of the compressor 101 and the rotation speed of the outdoor fan motor 114 of the outdoor machine 100 and controls the extent to which the first electromagnetic valve 111 is opened according to the received data, and the pipe control board 306 controls the extent to which the third electromagnetic valve 303 is opened according to the received data.

The refrigerant gas at high temperature and high pressure discharged through the gas outlet of the outdoor machine compressor 101 enters the oil separator 103, so that the impurities and the lubricating oil are separated by the oil separator 103 from the refrigerant gas, and the purified refrigerant gas is discharged from the gas discharge pipe of the oil separator 103 and enters the heat exchanger 102 of the outdoor machine through the first end 109A and the second end 109B of the four-way switching valve 109. Since the outdoor fan motor 114 draws outdoor air into the heat exchanger 102, the refrigerant gas at high temperature and high pressure is condensed by the heat exchanger 102 of the outdoor machine to radiate heat and converted into liquid at intermediate temperature and high pressure, and the refrigerant liquid at intermediate temperature and high pressure flows into the cold media distributor 108 of the outdoor machine, has the amount of cycled refrigerant adjusted by the cold media distributor 108, and subsequently enters the refreezer 119 through the first electronic expanding valve 111 of the outdoor, and the refrigerant liquid at intermediate temperature and high pressure is converted by the refreezer 119 through expansion and a drop in pressure into the refrigerant liquid at low temperature and high pressure, and subsequently the refrigerant liquid passes in sequence through the second end 121B and the third end 121C of the second three-way valve 121, the fourth electromagnetic valve 124, the indoor machine liquid pipe cutoff valve 106, the second cutoff valve 207, the second filter 202 and the second electronic expanding valve 204 to be throttled and then converted into a two-phase mixture of the refrigerant gas and liquid at low temperature and low pressure. The refrigerant gas and liquid enters the cold media distributor 203 and has the amount of cycled refrigerant adjusted by the cold media distributor 203, and subsequently the two-phase mixture of the refrigerant gas and liquid at low temperature and low pressure enters the indoor machine heat exchanger 201 and absorbs heat by the indoor machine heat exchanger 201 to be converted into the refrigerant as at low temperature and low pressure. In this process, the indoor air drawn by the indoor fan motor 205 into the heat exchanger 201 is cooled to drop in temperature and finally returned by the indoor fan motor 205 to the indoor through the air feeder, and the refrigerant gas at low temperature and low pressure enters the gas inflow pipe of the gas and liquid separator 104 through the first cutoff valve 206, the indoor machine gas pipe cutoff valve 107, the second electromagnetic valve 122, the second end 120B and the first end 120A of the first three-way valve 120, the fourth end 109D and the third end 109C of the four-way switching valve 109, and the cold media pressure sensor 118 in sequence; and in the meantime, a liquid mixture of the lubricating oil and the impurities discharged through the oil return pipe of the oil separator 103 has the impurities therein filtered out by the filter 105 and subsequently enters the gas inflow pipe of the gas and liquid separator 104 through the capillary 110, and the lubricating oil enters the compressor 101 through the gas inflow pipe of the compressor together with the refrigerant gas at low temperature and low pressure, so that the refrigerant has been cycled once through the outdoor machine and the indoor machine.

An operating principle of the multi-type air conditioner system according to one or more embodiments of the disclosure operating in the heating mode is as follows: the controller 400 transmits the heating operation signal to the outdoor machine control board 125 through the shielded signal line 700, so that the outdoor machine control board 125 controls the first electromagnetic valve 113 and the third electromagnetic valve 123 in the outdoor machine 100 to be opened and the second electromagnetic valve 122 and the fourth electromagnetic valve 124 of the outdoor machine to be closed; and in the meantime, the controller 400 further transmits the acquired indoor temperature and the received user-preset temperature data to the outdoor machine control board 125 and the pipe control board 306 through the shielded signal line 700, so that the outdoor machine control board 125 adjusts the operating frequency of the compressor 101 and the rotation speed of the outdoor fan motor 114 of the outdoor machine 100 and controls the extent to which the first electromagnetic valve 111 is opened according to the received data, and the pipe control board 306 controls the extent to which the third electromagnetic valve 303 is opened according to the received data.

The refrigerant gas at high temperature and high pressure discharged through the gas outlet of the outdoor machine compressor 101 enters the oil separator 103, so that the impurities and the lubricating oil are separated by the oil separator 103 from the refrigerant gas, and the purified refrigerant gas is discharged from the gas discharge pipe of the oil separator 103 and enters the filter 302 through the first end 109A and the fourth end 109D of the four-way switching valve 109, the first end 120A and the third end 120C of the first three-way valve 120, the first electromagnetic valve 113, the pipe set gas pipe cutoff valve 116 and the third cutoff valve 304 in sequence. The impurities in the refrigerant gas at high temperature and high pressure are filtered out by the filter 302, and subsequently the refrigerant gas at high temperature and high pressure enters the composite pipe 301 through the third electronic expanding valve 303, and since the composite pipe 301 with high thermal conductivity radiates heat into the rooms, the refrigerant gas at high temperature and high pressure radiates heat to the rooms, and the amount of refrigerant entering the composite pipe 301 is controlled by adjusting the extent to which the third electronic expanding valve 303 is opened so that the indoor temperature can be controlled precisely; and in the meantime, since there is no heating water in the composite pipe 301, when the air conditioner system is unused for a while, the composite pipe 301 will not be frozen and broken even if the system does not continue with being powered. After radiating heat, the refrigerant gas at high temperature and high pressure is converted into the refrigerant liquid at intermediate temperature and high pressure and discharged through the discharge pipe of the composite pipe 301 and subsequently enters the refreezer 119 through the fourth cutoff valve 305, the pipe set liquid pipe cutoff valve 115 and the third electromagnetic valve 123 in sequence, and the refrigerant liquid at intermediate temperature and high pressure is converted by the refreezer 119 into the refrigerant liquid at low temperature and high pressure. The refrigerant liquid is throttled by the first electronic expanding valve 111 and then converted into the refrigerant liquid at low temperature and low pressure and enters the cold media distributor 108 and has the amount of cycled refrigerant adjusted by the cold media distributor 108 and subsequently enter the heat exchanger 102 of the outdoor machine and absorbs heat by the heat exchanger 102 of the outdoor machine to be converted into the refrigerant gas at low temperature and low voltage, and the refrigerant gas at low temperature and low voltage enters the gas inflow pipe of the gas and liquid separator 104 through the second end 109B and the third end 109C of the four-way switching valve 109; and in the meantime, a liquid mixture of the lubricating oil and the impurities discharged through the oil return pipe of the oil separator 103 has the impurities therein filtered out by the filter 105 and subsequently enters the gas inflow pipe of the gas and liquid separator 104 through the capillary 110, and the lubricating, oil that can not be gasified enters the compressor 101 through the gas inflow pipe of the compressor together with the refrigerant gas at low temperature and low pressure, so that the refrigerant has been cycled once through the outdoor machine and the indoor machine.

As can be apparent from the technical solution above, a multi-type air conditioner system according to one or more embodiments of the disclosure may include four components which are an outdoor machine, an indoor machine, a pipe set and a controller, where an electromagnetic valve in a refrigerant pipe directed to the pipe set in is closed, and an electromagnetic valve in a refrigerant pipe directed to the indoor machine in is opened so that a refrigerant is cycled only between the outdoor and indoor machines to perform a refrigeration function; whereas the electromagnetic valve in the refrigerant pipe directed to the pipe set in is opened, and the electromagnetic valve in the refrigerant pipe of the indoor machine in is closed so that the refrigerant is cycled only between the outdoor machine and the pipe set to perform a heating function; and electronic expanding valves are arranged respectively in the outdoor machine, the indoor machine and the pipe set, and during operation in a heating mode, a pipe set control board of the pipe set controls the extent to which the electronic expanding valve in the pipe set is opened so as to adjust the flow of the refrigerant so that indoor temperature in the heating mode can be controlled. Since there is no hot water for heating in the pipe set, the air conditioner system may be idle without any operation for preventing the pipe set from being frozen and broken at low temperature, thus improving the reliability while saving power consumption.

The foregoing disclosure is merely illustrative of one or more embodiments of the disclosure but not intended to limit the claimed scope of the disclosure. Any modifications, equivalent substitutions, adaptations, etc., made without departing from the spirit and the principle of the disclosure shall be encompassed in the claimed scope of the disclosure.

The invention claimed is:

1. A multi-type air conditioner system, comprising: an outdoor machine, an indoor machine connected with the outdoor machine through a first refrigerant pipe, and a controller connected respectively with the outdoor machine and the indoor machine through a shielded signal line, the multi-type air conditioner system further comprising:
   a set of underfloor-heating pipes connected with the outdoor machine through a second refrigerant pipe; and
   wherein the controller is configured to transmit a refrigeration operation signal to the outdoor machine through the shielded signal line when the multi-type air conditioner system is operated in cooling mode so that refrigerant flows into the indoor machine, and the controller is configured to transmit a heating operation signal to the outdoor machine through the shielded signal line when the multi-type air conditioner system is operated in heating mode so that refrigerant at high temperature and high pressure gas state flows into at least the set of underfloor-heating pipes;
   wherein the outdoor machine comprises an outdoor machine control board unit, a refrigerant flow direction control unit, a refrigerant control unit, a valve controller, an over-pressure protection unit and a filter protection unit, wherein:
   the outdoor machine control board unit is configured to transmit a refrigerant flow direction control signal to the refrigerant flow direction control unit upon reception of the heating operation signal or the refrigeration operation signal transmitted by the controller and to transmit a refrigerant control signal to the refrigerant control unit according to received indoor temperature and user-preset temperature transmitted by the controller;
   the refrigerant flow direction control unit is configured to open the second refrigerant pipe connected with the set of underfloor-heating pipes so that the refrigerant flows into the set of underfloor-heating pipes or to open the first refrigerant pipe connected with the indoor machine so that the refrigerant flows into the indoor machine, upon reception of the refrigerant flow direction control signal transmitted by the outdoor machine control board unit;
   the refrigerant control unit is configured to control modality of the refrigerant and to control the flow of the refrigerant upon reception of the refrigerant control signal transmitted by the outdoor machine control board;
   the valve controller is configured to control valves in the outdoor machine through an outdoor machine control board;
   the over-pressure protection unit is configured to detect the pressure of the refrigerant in refrigerant pipes and to stop a compressor from operating when the pressure exceeds a threshold; and
   the filter protection unit is configured to filter out impurities in the refrigerant and to return lubricating oil separated from the refrigerant to the compressor.

2. The multi-type air conditioner system according to claim 1, wherein the refrigerant flow direction control unit comprises a first electromagnetic valve, a second electromagnetic valve, a third electromagnetic valve and a fourth electromagnetic valve, wherein:
   the first electromagnetic valve is arranged on the second refrigerant pipe connected with a refrigerant inflow end of the set of underfloor-heating pipes to control the second refrigerant pipe connected with the refrigerant inflow end of the set of underfloor-heating pipes to be opened or closed;
   the second electromagnetic valve is arranged on the first refrigerant pipe connected with a refrigerant outflow end of the indoor machine to control the first refrigerant pipe connected with the refrigerant outflow end of the indoor machine to be opened or closed;
   the third electromagnetic valve is arranged on the second refrigerant pipe connected with a refrigerant outflow end of the set of underfloor-heating pipes to control the second refrigerant pipe connected with the refrigerant outflow end of the set of underfloor-heating pipes to be opened or closed; and
   the fourth electromagnetic valve is arranged on the first refrigerant pipe connected with a refrigerant inflow end of the indoor machine to control the first refrigerant pipe connected with the refrigerant inflow end of the indoor machine to be opened or closed.

3. The multi-type air conditioner system according to claim 2, wherein:
   when the multi-type air conditioner system operates in the cooling mode, the controller transmits the refrigeration operation signal to the outdoor machine control board unit through the shielded signal line, so that the outdoor machine control board unit controls the second electromagnetic valve and the fourth electromagnetic valve in the refrigerant flow direction control unit to be opened and the first electromagnetic valve and the third electromagnetic valve to be closed.

4. The multi-type air conditioner system according to claim 2, wherein:
   when the multi-type air conditioner system operates in the heating mode, the controller transmits the heating operation signal to the outdoor machine control board unit through the shielded signal line, so that the outdoor machine control board unit controls the second electromagnetic valve and the fourth electromagnetic valve in the refrigerant flow direction control unit to be closed and the first electromagnetic valve and the third electromagnetic valve to be opened.

5. The multi-type air conditioner system according to claim 1, wherein the refrigerant control unit comprises the compressor, a first heat exchanger, a first cold medium distributor, a first refreezer and an outdoor fan motor, wherein:
- an input end of the compressor is connected with the filter protection unit, and an output end thereof is connected with the over-pressure protection unit;
- an input end of the first heat exchanger is connected with the valve control unit, and an output end thereof is connected with the first cold medium distributor;
- an output end of the first refreezer is connected with the valve control unit; and
- the outdoor fan motor is arranged proximate to the first heat exchanger.

6. The multi-type air conditioner system according to claim 5, wherein the refrigerant control unit further comprises a first electronic expanding valve; and
- an input end of the first electronic expanding valve is connected with an output end of the first cold medium distributor, and an output end thereof is connected with an input end of the first refreezer, and the first electronic expanding valve is electrically connected with the outdoor machine control board.

7. A multi-type air conditioned system, comprising: an outdoor machine, an indoor machine connected with the outdoor machine through a first refrigerant pipe, and a controller connected respectively with the outdoor machine and the indoor machine through a shielded signal line, the multi-type air conditioner system further comprising:
- a set of underfloor-heating pipes connected with the outdoor machine through a second refrigerant pipe; and
- wherein the controller is configured to transmit a refrigeration operation signal to the outdoor machine through the shielded signal line when the multi-type air conditioner system is operated in cooling mode so that refrigerant flows into the indoor machine, and the controller is configured to transmit a heating operation signal to the outdoor machine through the shielded signal line when the multi-type air conditioner system is operated in heating mode so that refrigerant at high temperature and high pressure gas state flows into at least the set of underfloor-heating pipes;
- wherein the indoor machine comprises a second heat exchanger, a second filter, a second cold medium distributor, a second electronic expanding valve, an indoor fan motor, a first cutoff valve, a second cutoff valve and an indoor machine control board, wherein:
- an input end of the second heat exchanger is connected with an output end of the second cold medium distributor, and an output end thereof is connected with an input end of the first cutoff valve;
- an input end of the second filter is connected with an output end of the second cutoff valve, and an output end thereof is connected with an input end of the second electronic expanding valve;
- an input end of the second cold medium distributor is connected with an output end of the second electronic expanding valve, and an output end thereof is connected with the input end of the second heat exchanger;
- an input end of the second electronic expanding valve is connected with an output end of the second filter, and an output end thereof is connected with the input end of the second cold medium distributor, and the second electronic expanding valve is connected with the indoor machine control board;
- the indoor fan motor is arranged proximate to the second heat exchanger;
- the input end of the first cutoff valve is connected with an output end of the second heat exchanger, and the output end thereof is connected with an input end of the manifold; and
- an input end of the second cutoff valve is connected with an input end of the first refrigerant pipe, and the output end thereof is connected with the input end of the manifold.

8. A multi-type air conditioner system, comprising: an outdoor machine, an indoor machine connected with the outdoor machine through a first refrigerant pipe, and a controller connected respectively with the outdoor machine and the indoor machine through a shielded signal line, the multi-type air conditioner system further comprising:
- a set of underfloor-heating pipes connected with the outdoor machine through a second refrigerant pipe; and
- wherein the controller is configured to transmit a refrigeration operation signal to the outdoor machine through the shielded signal line when the multi-type air conditioner system is operated in cooling mode so that refrigerant flows into the indoor machine, and the controller is configured to transmit a heating operation signal to the outdoor machine through the shielded signal line when the multi-type air conditioner system is operated in heating mode so that refrigerant at high temperature and high pressure gas state flows into at least the set of underfloor-heating pipes;
- wherein the set of underfloor-heating pipes comprise a composite pipe, a third cutoff valve, a third filter, a third electronic expanding valve, a fourth cutoff valve and a pipe control board;
- wherein the third cutoff valve, the third filter and the third electronic expanding valve are arranged in sequence in the inflow direction of a refrigerant on the second refrigerant pipe connected with a refrigerant inflow end of the composite pipe.

9. The multi-type air conditioner system according to claim 1, wherein when the multi-type air conditioner system operates in the heating mode, the controller transmits the indoor temperature and the user-preset temperature data to the set of underfloor-heating pipes control board through the shielded signal line, and the set of underfloor-heating pipes control board controls the extent to which the third electronic expanding valve is opened according to the received signal to thereby adjust heating temperature.

10. The multi-type air conditioner system according to claim 7, wherein refrigerant flows into the indoor machine and the set of underfloor-heating pipes at high temperature and high pressure gas state when the multi-type air conditioner system is operated in the heating mode.

11. The multi-type air conditioner system according to claim 8, wherein the composite pipe is connected with the outdoor machine through the second refrigerant pipe and a manifold.

12. The multi-type air conditioner system according to claim 8, wherein the composite pipe is a copper pipe on the surface of which Polyethylene of raised temperature resistance (PE-RT), polyvinylchloride (PVC) or cross-linked polyethylene (PE-X) is coated.

13. The multi-type air conditioner system according to claim 8, wherein the third electronic expanding valve is electrically connected with the pipe control board.

14. The multi-type air conditioner system according to claim 8, the pipe control board is connected with the controller through the shielded signal line.

15. The multi-type air conditioner system according to claim 8, the fourth cutoff valve is arranged on the second refrigerant pipe connected with a refrigerant outflow end of the composite pipe.

\* \* \* \* \*